United States Patent
Yang et al.

(10) Patent No.: US 11,985,679 B2
(45) Date of Patent: May 14, 2024

(54) WIRELESS COMMUNICATION METHOD AND DEVICE

(71) Applicant: VIVO MOBILE COMMUNICATION CO., LTD., Guangdong (CN)

(72) Inventors: Yu Yang, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 436 days.

(21) Appl. No.: 17/319,575

(22) Filed: May 13, 2021

(65) Prior Publication Data

US 2021/0266947 A1   Aug. 26, 2021

Related U.S. Application Data

(63) Continuation of application No. PCT/CN2019/106679, filed on Sep. 19, 2019.

(30) Foreign Application Priority Data

Nov. 16, 2018   (CN) .......................... 201811368456.8

(51) Int. Cl.
*H04W 72/12*   (2023.01)
*H04W 72/04*   (2023.01)
*H04W 72/044*   (2023.01)
*H04W 72/23*   (2023.01)
*H04W 28/06*   (2009.01)

(52) U.S. Cl.
CPC ......... *H04W 72/23* (2023.01); *H04W 72/046* (2013.01); *H04W 28/06* (2013.01)

(58) Field of Classification Search
CPC ... H04W 72/23; H04W 72/046; H04W 28/06; H04B 7/088; H04B 7/0408; H04B 7/0695; H04B 17/373; H04L 5/001; H04L 5/0053; H04L 5/0023; H04L 5/0051
USPC .................................................. 370/329–330
See application file for complete search history.

(56) References Cited

U.S. PATENT DOCUMENTS

| | | |
|---|---|---|
| 2018/0042028 A1 | 2/2018 | Nam et al. |
| 2018/0302889 A1 | 10/2018 | Guo et al. |
| 2020/0045569 A1* | 2/2020 | Seo ............ H04L 5/0048 |
| 2020/0154380 A1* | 5/2020 | Zhou .......... H04L 5/0094 |

(Continued)

FOREIGN PATENT DOCUMENTS

| | | |
|---|---|---|
| CN | 108012329 A | 5/2018 |
| CN | 108199819 A | 6/2018 |
| WO | WO-2018143702 A1 | 8/2018 |

OTHER PUBLICATIONS

International Search Report and Written Opinion of the International Searching Authority regarding International Patent Application No. PCT/CN2019/106679, dated Nov. 27, 2019. Translation provided by Bohui Intellectual Property.

(Continued)

*Primary Examiner* — Candal Elpenord
(74) *Attorney, Agent, or Firm* — Harness, Dickey & Pierce, P.L.C.

(57) ABSTRACT

A wireless communication method includes: receiving association relationship indication information; and determining that multiple first CORESETs have an association relationship according to the association relationship indication information, where the multiple first CORESETs share first QCL information.

20 Claims, 4 Drawing Sheets

Receive association relationship indication information — S110

Determine that multiple first control resource sets have an association relationship, wherein the multiple first CORESETs share first QCL information — S120

(56) References Cited

U.S. PATENT DOCUMENTS

| | | | |
|---|---|---|---|
| 2020/0221508 A1 | 7/2020 | Huang et al. | |
| 2021/0037603 A1* | 2/2021 | Li | H04L 1/189 |
| 2021/0084623 A1 | 3/2021 | Zhang et al. | |
| 2021/0409094 A1* | 12/2021 | Yuan | H04W 72/23 |

OTHER PUBLICATIONS

"Remaining Details on Beam Management," CATT, 3GPP TSG RAN WG1 Meeting 91 R1-1720182, dated Dec. 1, 2017.

"Multi-beam operation for NR-PDCCH," Fujitsu, 3GPP TSG RAN WG1 Meeting NR#3, R1-1715485, dated Sep. 21, 2017.

First Office Action regarding Chinese Patent Application No. 201811368456.8, dated Sep. 25, 2020. Translation provided by Bohui Intellectual Property.

Second Office Action regarding Chinese Patent Application No. 201811368456.8, dated Apr. 30, 2021. Translation provided by Bohui Intellectual Property.

"Summary of Beam Mgmt Open Issues," Qualcomm, 3GPP TSG RAN WG1 Meeting #91, R1-1721396, dated Dec. 1, 2017.

Supplementary European Search Report regarding Application No. 19883586.0-1216/3883136; PCT/CN2019/106679, dated Dec. 3, 2021.

"Spatial QCL considerations for multiplexing of physical channels and RS," Intel Corporation, 3GPP TSG RAN WG1 Meeting #92b, R1-1804717, dated Apr. 20, 2018.

"Remaining issues on downlink control channel," LG Electronics, 3GPP TSG RAN WG1 Meeting #95, R1-1812549, dated Nov. 16, 2018.

\* cited by examiner

WIRELESS COMMUNICATION METHOD AND DEVICE

CROSS-REFERENCE OF RELATED APPLICATIONS

This application is a Bypass Continuation Application of PCT/CN2019/106679 filed on Sep. 19, 2019, which claims priority to Chinese Patent Application No. 201811368456.8 filed on Nov. 16, 2018, which are incorporated herein by reference in their entirety.

TECHNICAL FIELD

This application relates to the field of communications technologies, and more specifically, to a wireless communication method and a device.

BACKGROUND

In current mobile communication systems, for beam indication of a physical downlink control channel (PDCCH), a network device uses radio resource control (RRC) signaling to configure K transmission configuration indication (TCI) states for each control resource set (CORESET). When K>1, a media access control (MAC) control element (CE) indicates a TCI state, and when K=1, no additional MAC CE command is required. When a terminal device monitors a CORESET, it uses the same quasi co-location (QCL) information, that is, the same TCI state, for all search spaces inside a CORESET. The terminal device can know a receive beam of a PDCCH according to the TCI state.

As can be seen from the above description, for beam indication of a downlink channel, candidate QCL information is usually configured for each CORESET through RRC signaling, and then a MAC CE command is used for indication. During reconfiguration of the candidate QCL information, RRC signaling needs to be used again for configuration, resulting in high signaling overheads.

SUMMARY

Some embodiments of the present disclosure aim to provide a wireless communication method and a device.

A first aspect provides a wireless communication method. The method includes: receiving association relationship indication information; and determining that multiple first CORESETs have an association relationship according to the association relationship indication information, where the multiple first CORESETs share first QCL information.

A second aspect provides a wireless communication method. The method includes: generating association relationship indication information, where the association relationship indication information is used to indicate that multiple first control resource sets CORESETs have an association relationship, and the multiple first CORESETs share first QCL information; and sending the association relationship indication information.

A third aspect provides a terminal device. The terminal device includes: a transceiver module, configured to receive association relationship indication information; and a processing module, configured to determine that multiple first CORESETs have an association relationship according to the association relationship indication information, where the multiple first CORESETs share first QCL information.

A fourth aspect provides a network device. The network device includes: a processing module, configured to generate association relationship indication information, where the association relationship indication information is used to indicate that the multiple first control resource sets CORESET have an association relationship, and the multiple first CORESETs share first QCL information; and a transceiver module, configured to send the association relationship indication information.

According to a fifth aspect, a terminal device is provided, and includes: a memory, a processor, and a computer program that is stored in the memory and executable on the processor, and when the computer program is executed by the processor, steps in the wireless communication method provided in the first aspect are implemented.

According to a sixth aspect, a network device is provided, and includes: a memory, a processor, and a computer program that is stored in the memory and executable on the processor, and when the computer program is executed by the processor, steps in the wireless communication method provided in the second aspect are implemented.

According to a seventh aspect, a non-transitory computer-readable medium is provided, where the non-transitory computer-readable storage medium stores a computer program, and when the computer program is executed by a processor, steps in the method provided in the first aspect are implemented.

According to an eighth aspect, a non-transitory computer-readable medium is provided, where the non-transitory computer-readable storage medium stores a computer program, and when the computer program is executed by a processor, steps of the method provided in the second aspect are implemented.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings.

DETAILED DESCRIPTION OF EMBODIMENTS

The following clearly describes the technical solutions in some embodiments of the present disclosure with reference to the accompanying drawings in some embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

The technical solutions of the present disclosure can be applied to various communications systems, such as a long term evolution (LTE)/long term evolution-advanced (LTE-A) system, a new radio (NR) system, etc.

In the embodiment of the present disclosure, a terminal device also known as a user equipment (UE), a mobile terminal, a mobile user equipment, etc, may communicate with one or more core networks through a radio access network (RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network.

In some embodiments of the present disclosure, the network device is an apparatus deployed in a radio access network to provide a wireless communication function for the terminal device. For example, the network device can be a base station, which can be an evolved NodeB (eNB or e-NodeB) in LTE and a 5G base station (gNB).

It should be noted that the antenna set in some embodiments of the present disclosure can also be expressed as an antenna panel set, an antenna port set, etc.

The following describes the technical solutions in various embodiments of the present disclosure in detail with reference to the accompanying drawings.

Figure 1:
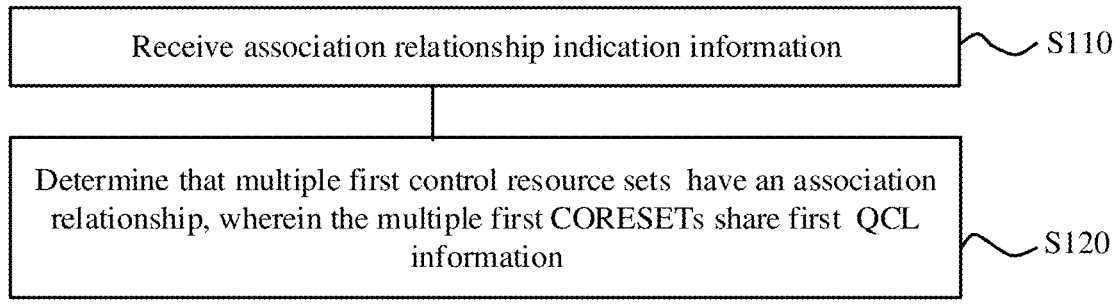
FIG. 1 is a schematic flowchart of a wireless communication method according to an embodiment of the present disclosure.

FIG. 1 shows a wireless communication method according to an embodiment of this application. The method shown in FIG. 1 may be performed by a terminal device, and as shown in FIG. 1, the method includes:

S110. Receive association relationship indication information.

The association relationship indication information in S110 can explicitly indicate that the multiple CORESETs have the association relationship, and can also implicitly indicate that the multiple CORESETs have the association relationship.

S120: Determine that multiple first control resource sets CORESETs have an association relationship according to the association relationship indication information, where the multiple first CORESETs share first QCL information.

The multiple first CORESETs in S120 are located in the same component carrier (CC), or at least two first CORESETs in the multiple first CORESETs are located in different CCs. Alternatively, it is understood as that the multiple interrelated CORESETs can be located in the same CC, and can also be located in different CCs.

Optionally, in some embodiments, the association relationship indication information includes antenna set related information. Correspondingly, in S120, the determining that multiple first CORESETs have an association relationship according to the association relationship indication information includes: determining that the multiple first CORESETs have an association relationship according to the antenna set related information. Alternatively, it is understood as determining whether the multiple first CORESETs have an association relationship according to whether the corresponding antenna set related information is the same.

For example, when antenna set related information corresponding to the multiple first CORESETs is the same, it is determined that the multiple first CORESETs have an association relationship.

The antenna set related information may include one of the following information: an antenna set identifier (for example, an antenna panel number); related information of a reference signal (RS) resource, where the related information of the RS resource and the antenna set have an association relationship; related information of an RS resource set, where the related information of the RS resource set and the antenna set have an association relationship; a transmission configuration indication (TCI) state in configuration information of a CORESET, where the TCI state and the antenna set have an association relationship; and an RS set corresponding to a TCI state in configuration information of a CORESET, where the RS set and the antenna set have an association relationship; and an RS corresponding to a TCI state in configuration information of a CORESET, where the RS and the antenna set have an association relationship. The association relationship herein can be configured by the network device for the terminal device, and can also be agreed in advance by the protocol.

The RS herein can be a sounding reference signal (SRS), and can also be a channel state information reference signal (CSI-RS), etc. The related information of the RS resource set herein can be an RS resource set identifier (or index).

For example, the RS resource set identifier is an SRS resource set index. Assuming that the terminal device is configured with 4 CORESETs, namely, CORESET 1, CORESET 2, CORESET 3, and CORESET 4, where the TCI state in the configuration information of CORESET 1 corresponds to SRS resource set index 1, the TCI state in the configuration information of CORESET 2 corresponds to SRS resource set index 2, the TCI state in the configuration information of CORESET 3 corresponds to SRS resource set index 2, the TCI state in the configuration information of CORESET 4 corresponds to SRS resource set index 2, and SRS resource set index 1 corresponds to the antenna set 1 and SRS resource set index 2 corresponds to the antenna set 2, it can be determined that CORESET 2, CORESET 3, and CORESET 4 have the association relationship.

As an example, the antenna set related information includes the TCI state in the configuration information of CORESET. In this case, it is determined that the multiple first CORESETs have the association relationship according to the antenna set related information, which specifically can be determining that the multiple first CORESETs have the association relationship according to the TCI state in the configuration information of CORESET. Alternatively, it can be understood as determining whether the multiple first CORESETs have the association relationship according to whether the TCI states in the configuration information of CORESET are the same.

For example, assuming that the terminal device is configured with 4 CORESETs, namely, CORESET 1, CORESET 2, CORESET 3, and CORESET 4, where the TCI state in the configuration information of CORESET 1 is the value 1, the TCI state in the configuration information of CORESET 2 is the value 2, the TCI state in the configuration information of CORESET 3 is the value 2, the TCI state in the configuration information of CORESET 4 is the value 1, and the value 1 of the TCI state corresponds to the antenna set 1 and the value 2 of the TCI state corresponds to the antenna set 2, it can be determined that CORESET 1 and CORESET 4 have the association relationship, and CORESET 2 and CORESET 3 have the association relationship.

As another example, the antenna set related information includes an RS set corresponding to the TCI state in the configuration information of CORESET. In this case, the multiple first CORESETs are determined according to the antenna set related information, which specifically can be determining that the multiple first CORESETs have the association relationship according to the RS set corresponding to the TCI state in the configuration information of CORESET. Alternatively, it can be understood as determining whether the multiple first CORESETs have the association relationship according to whether RS sets corresponding to the TCI states in the configuration information of CORESET are the same.

For example, assuming that the terminal device is configured with 4 CORESETs, namely, CORESET 1, CORESET 2, CORESET 3, and CORESET 4, where the TCI state in the configuration information of CORESET 1 corresponds to RS set 1, the TCI state in the configuration information of CORESET 2 corresponds to RS set 2, the TCI state in the configuration information of CORESET 3 corresponds to RS set 1, the TCI state in the configuration information of CORESET 4 corresponds to RS set 2 and RS set 3, and RS set 1 corresponds to the antenna set 1 and RS set 2 and RS set 3 correspond to the antenna set 2, it can be determined that CORESET 1 and CORESET 3 have the association relationship, and CORESET 2 and CORESET 4 have the association relationship.

Optionally, in S110, the receiving association relationship indication information includes: receiving the antenna set related information through at least one of: the configuration information of CORESET; the TCI state in the configuration information of CORESET; configuration information of RS set corresponding to TCI state in the configuration information of CORESET; configuration information of an RS corresponding to a TCI state in configuration information of a CORESET; configuration information of an RS resource corresponding to a TCI state in configuration information of a CORESET; configuration information of an RS resource set, where at least one RS resource in the RS resource set is an RS resource corresponding to a TCI state in configuration information of a CORESET; configuration information of an RS resource, where at least one RS resource in at least one RS resource set configured for the configuration information of the RS resource is an RS resource corresponding to a TCI state in configuration information of a CORESET; or reporting configuration information, where at least one RS resource in at least one RS resource set associated with the reporting configuration information is an RS resource corresponding to a TCI state in configuration information of a CORESET.

It can be understood that if the antenna set related information is received through the configuration information of the RS corresponding to the TCI state in the configuration information of CORESET, the antenna set (the antenna set determined according to the antenna set related information) associated with CORESET is used to transmit all the control information in CORESET and the RS corresponding to the TCI state in the configuration information of CORESET.

Alternatively, if the antenna set related information is received through the configuration information of the RS set corresponding to the TCI state in the configuration information of CORESET, the antenna set (the antenna set determined according to the antenna set related information) associated with CORESET is used to transmit all the control information in CORESET and all RSs in the RS set corresponding to the TCI state in the configuration information of CORESET.

Alternatively, if the antenna set related information is received through the configuration information of the RS resource of the RS corresponding to the TCI state in the configuration information of CORESET, the antenna set associated with CORESET is used to transmit all the control information in CORESET and the RS on the RS resource corresponding to the TCI state in the configuration information of CORESET.

Alternatively, if the antenna set related information is received through the configuration information of the RS resource set, the antenna set associated with CORESET is used to transmit all the control information in CORESET and RSs on all the RS resources in the RS resource set.

Alternatively, if the antenna set related information is received through the configuration information of the RS resource, the antenna set associated with CORESET is used to transmit all the control information in CORESET and RSs on all the RS resources in all the RS resource sets configured by the configuration information of the RS resource.

Alternatively, if the antenna set related information is received through the reporting configuration information, the antenna set associated with CORESET is used to transmit all the control information in CORESET and RSs on all the RS resources in all the RS resource sets associated with the reporting configuration information.

For example, the RS is a CSI-RS, the configuration information of the RS resource (Resource Config parameter) can be information carried in the RRC signaling parameter CSI-ResourceConfig, and the reporting configuration information (ReportConfig parameter) can be information carried in the RRC signaling parameter CSI-ReportConfig.

Optionally, as an example, if the antenna set related information is one of the antenna set identifier, the related information of the RS resource, and the related information of the RS resource set, the antenna set related information is received through the configuration information of CORESET or the TCI state in the configuration information of CORESET. Alternatively, it is understood as if the antenna set related information is one of the antenna set identifier, the related information of the RS resource, and the related information of the RS resource set, the antenna set related information is carried in the configuration information of CORESET, or carried in the TCI state in the configuration information of CORESET.

Alternatively, if the antenna set related information is the RS corresponding to the TCI state in the configuration information of CORESET, the antenna set related information is received through the TCI state in the configuration information of CORESET, or the antenna set related information is received through the configuration information of the RS set corresponding to the TCI state in the configuration information of CORESET. Alternatively, it is understood as if the antenna set related information is the RS corresponding to the TCI state in the configuration information of CORESET, the antenna set related information is carried in the TCI state in the configuration information of CORESET, or the antenna set related information is carried in the configuration information of the RS set corresponding to the TCI state in the configuration information of CORESET.

Alternatively, if the antenna set related information is the RS set corresponding to the TCI state in the configuration information of CORESET, the antenna set related information is received through the TCI state in the configuration information of CORESET. Alternatively, it is understood as if the antenna set related information is the RS set corresponding to the TCI state in the configuration information of CORESET, the antenna set related information is carried in the TCI state in the configuration information of CORESET.

Alternatively, if the antenna set related information is related information of the RS resource set, the antenna set related information is received through configuration information of the RS resource of the RS corresponding to the TCI state in the configuration information of CORESET, or through the configuration information of the RS resource set of the RS corresponding to the TCI state in the configuration information of CORESET. Alternatively, it is understood as if the antenna set related information is the RS resource set related information, the antenna set related information is carried in the configuration information of the RS resource of the RS corresponding to the TCI state in the configuration information of CORESET, or the antenna set related information is carried in the configuration information of the RS resource set of the RS corresponding to the TCI state in the configuration information of CORESET.

For example, assuming that the antenna set related information is an SRS resource set index, and the RS corresponding to the TCI state in the configuration information of CORESET is a CSI-RS, the SRS resource set index can be carried in NZP-CSI-RS-Resource, or the SRS resource set index can be carried in NZP-CSI-RS-ResourceSet.

Optionally, in some embodiments, multiple first CORESETs in S120 share the same candidate TCI state. In this case, the method shown in FIG. 1 further includes: in a case where the number of candidate TCI states is one, determining the QCL information indicated by the candidate TCI state as the first QCL information; in a case where the number of candidate TCI states is multiple, receiving a MAC CE command, and determining QCL information indicated by a first target TCI state indicated by the MAC CE command in the candidate TCI states as the first QCL information.

The candidate TCI state may be configured by the network device through RRC signaling.

Optionally, in some embodiments, the method shown in FIG. 1 further includes: determining a target first CORESET in the multiple first CORESETs; and determining the QCL information of the target first CORESET as the first common QCL information. In this case, the network device can only configure QCL information for the target first CORESET through RRC signaling (or RRC signaling and MAC CE signaling), and other CORESETs in the multiple first CORESETs share the QCL information of the target first CORESET. The network device does not need to configure QCL information for each first CORESET separately, to reduce signaling overheads.

The target first CORESET herein may be a CORESET that meets certain rules (requirements) in the multiple first CORESETs. For example, the target first CORESET is the CORESET whose index is a preset value in the multiple first CORESETs, or the target first CORESET is the CORESET with the lowest (or the highest) index in the multiple first CORESETs.

It should be noted that the first QCL information of the multiple first CORESETs may be used as QCL information used by a control channel (for example, a PDCCH) corresponding to control information (for example, DCI) transmitted in the multiple first CORESETs.

Figure 2:
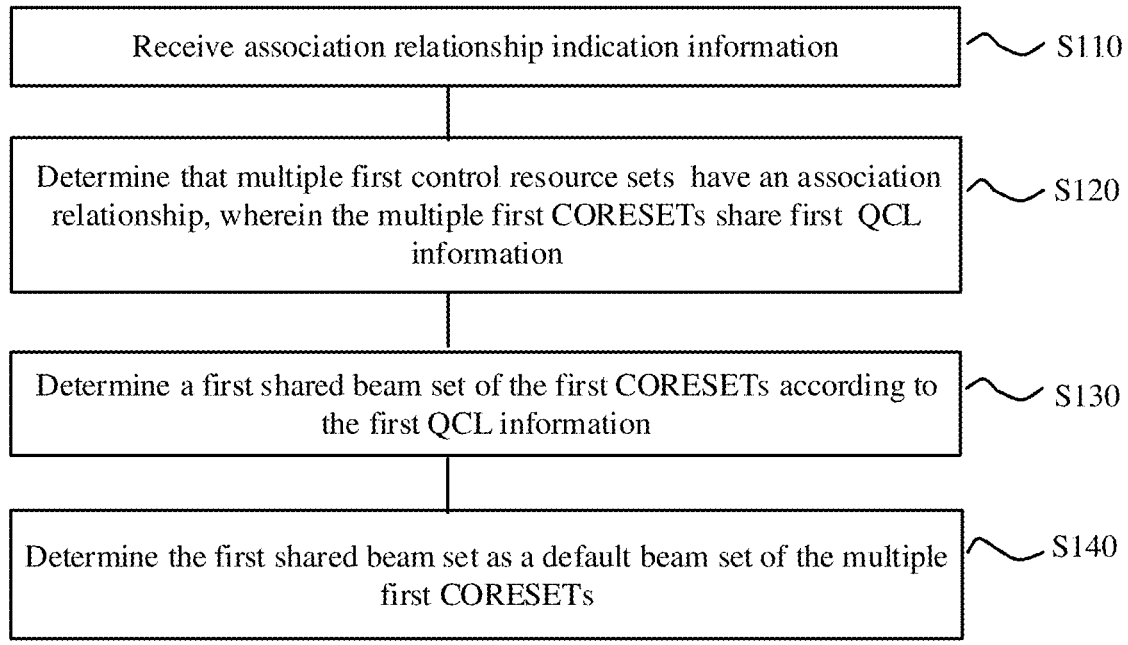
FIG. 2 is another schematic flowchart of a wireless communication method according to an embodiment of the present disclosure.

Further, as shown in FIG. 2, the method shown in FIG. 1 further includes:

S130: Determine a first shared beam set of the first CORESETs according to the first QCL information.

S140: Determine the first shared beam set as a default beam set of the multiple first CORESETs.

It should be noted that the beam in the first shared beam set in S140 can transmit signals at the same time. For example, the terminal device can simultaneously receive control information in the multiple first CORESETs through the beam in the first shared beam set.

It can be understood that after the first shared beam set is determined as the default beam set of the multiple first CORESETs in S140, when the network device and the terminal device perform signal transmission, the first shared beam (the default beam) is used for signal transmission, and the network device does not need to perform configuration and indication through signaling, to further reduce signaling overheads.

At present, with the enhancement of the terminal device's capabilities, one terminal device may support multiple antenna sets (antenna panels). When beam configuration and indication are performed for the terminal device with multiple antenna sets, signaling overheads are further increased compared to a single antenna set.

To resolve the problem of increased signaling overheads in the case of multiple antenna sets, the beam in the first shared beam set corresponds to at least one antenna set in some embodiments of the present disclosure. For example, the beam in the first shared beam set corresponds to one antenna set. In this case, all CORESETs that use one antenna panel for transmission share the same QCL. The network device can configure QCL information for all the CORESETs corresponding to the antenna panel and does not need to configure QCL information for each CORESET, to reduce signaling overheads.

Figure 3:
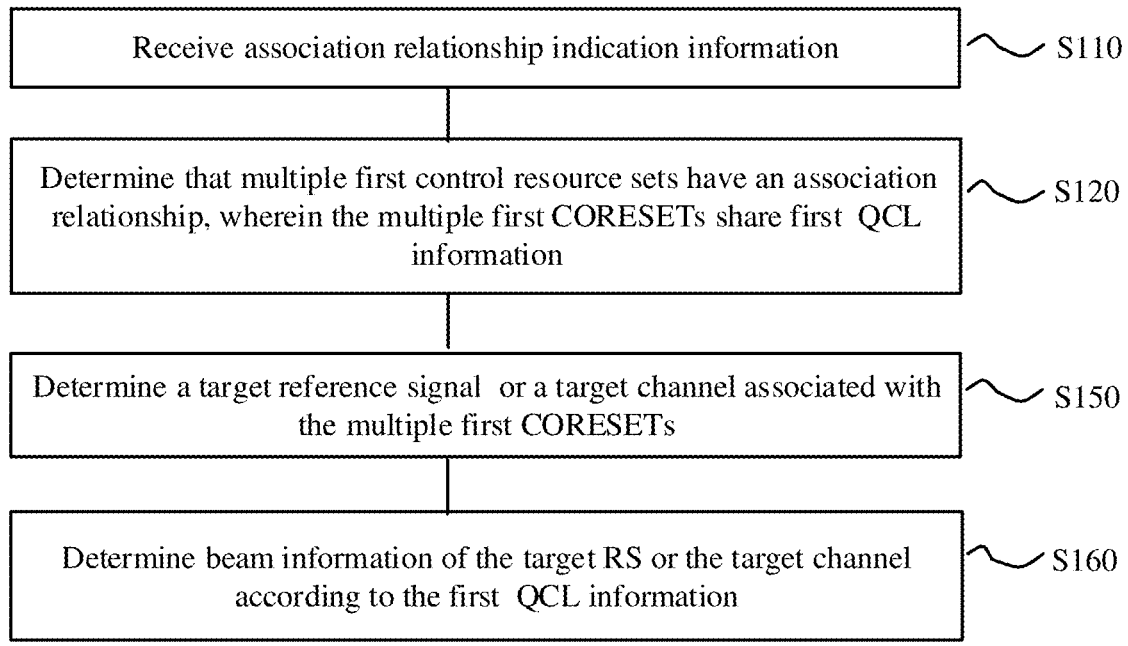
FIG. 3 is still another schematic flowchart of a wireless communication method according to an embodiment of the present disclosure.

As shown in FIG. 3, the method shown in FIG. 1 further includes:

S150: Determine a target reference signal RS or a target channel associated with the multiple first CORESETs.

In S150, the target RS may include at least one of: a source RS corresponding to a TCI state configured for the multiple first CORESETs; an RS whose corresponding source RS is the same as a source RS corresponding to a TCI state configured for the multiple first CORESETs; an RS that is associated with the multiple first CORESETs and indicated by radio resource control RRC signaling; an RS that is associated with the multiple first CORESETs and indicated by the MAC CE; or all RSs (uplink RS and downlink RS) transmitted in an antenna set corresponding to the multiple first CORESETs.

In S150, the target channel includes at least one of: a PDSCH scheduled by a physical downlink control channel PDCCH transmitted on the multiple first CORESETs; a channel whose corresponding source RS is the same as a source RS corresponding to a TCI state configured for the multiple first CORESETs; a channel that is associated with the multiple first CORESETs and indicated by RRC signaling; a channel that is associated with the multiple first CORESETs and indicated by the MAC CE; channels in all channels transmitted in an antenna set corresponding to the multiple first CORESETs other than channels in the multiple first CORESETs; or a physical uplink shared channel PUSCH scheduled by a PDCCH transmitted in the multiple first CORESETs.

S160: Determine beam information of the target RS or the target channel according to the first QCL information.

Optionally, in some embodiments, in S160, the determining beam information of the target RS or the target channel according to the first QCL information includes: in a case where the target RS is a target downlink RS or the target channel is a target downlink channel, determining the first QCL information as QCL information of the target RS or the target channel; and in a case where the target RS is a target uplink RS or the target channel is a target uplink channel, determining spatial relation information of the target RS or the target channel according to a source RS corresponding to a transmission configuration indicator TCI state used to indicate the first QCL information.

Therefore, in the technical solutions of some embodiments of the present disclosure, the QCL information or the spatial relation information of the RS or the channel associated with the CORESET can be determined based on the QCL information of the CORESET. Therefore, the network device does not need to configure and indicate QCL information or spatial relation information for the RS or the channel associated with the CORESET, to further reduce signaling overheads.

In some embodiments of the present disclosure, optionally, the method shown in FIG. 1 further includes: determining that multiple second CORESETs have an association relationship according to the association relationship indication information, where the multiple first CORESETs and the multiple second CORESETs have no association relationship, and the multiple second CORESETs share second QCL information. That is, multiple independent CORESET sets that are related to each other are allowed. The CORESETs in each CORESET set have an association relationship, and the CORESETs in different CORESET sets have no association relationship.

Optionally, in some embodiments, the association relationship indication information includes antenna set related information. Correspondingly, the determining that multiple second CORESETs have an association relationship according to the association relationship indication information includes: determining that the multiple second CORESETs have an association relationship according to the antenna set related information. Alternatively, it is understood as determining whether the multiple second CORESETs have an association relationship according to whether the corresponding antenna set related information is the same.

For example, in a case where antenna set related information corresponding to the multiple second CORESETs is the same, it is determined that the multiple second CORESETs have an association relationship.

Further, a second shared beam set of the multiple second CORESETs is determined according to the second QCL information; and the second shared beam set is determined as a default beam set of the multiple second CORESETs.

The beam in the second shared beam set herein corresponds to at least one antenna set. In addition, the beams in the second beam set can transmit signals at the same time. For example, the terminal device can receive control information in the multiple second CORESETs through the beam in the second shared beam set.

The first shared beam set and the second shared beam set are different. The first shared beam set and the second shared beam set are used to implement simultaneous transmission of control information in the multiple first CORESETs and control information in the multiple second CORESETs. For example, the terminal device uses the first shared beam set and the second shared beam set to implement simultaneous reception of control information in the multiple first CORESETs and control information in the multiple second CORESETs.

In other words, if the first shared beam set corresponds to a first antenna panel and the second shared beam set corresponds to a second antenna panel, channels or reference signals transmitted by beams corresponding to the first antenna panel and the second antenna panel can be simultaneously transmitted.

On the basis of all the foregoing embodiments, the method shown in FIG. 1 further includes: determining a first shared resource used by feedback information of a physical downlink shared channel (Physical Downlink Shared Channel, PDSCH) scheduled by the control information in the multiple first CORESETs; and determining a second shared resource used by feedback information of a PDSCH scheduled by control information in the multiple second CORESETs, where the first shared resource is different from the second shared resource. The feedback information herein may be ACK/NACK information.

Optionally, as an example, the first shared resource is a physical uplink control channel (Physical Uplink Control Channel, PUCCH) resource; and/or the second shared resource is a PUCCH resource.

For example, ACK/NACK information of the PDSCH scheduled by a downlink grant (Downlink Grant, DL Grant) in multiple CORESETs with an association relationship is placed in the same PUCCH resource, and ACK/NACK information of the PDSCH scheduled by a downlink grant in the CORESETs that have no association relationship is placed in different PUCCH resources.

The foregoing describes the wireless communication method according to an embodiment of the present disclosure in detail with reference to FIG. 1 to FIG. 3. Another wireless communication method according to an embodiment of the present disclosure will be described in detail below with reference to FIG. 4. It should be noted that the interaction between the terminal device and the network device described from the network device side is the same as that described on the terminal device side, and to avoid repetition, relevant descriptions are appropriately omitted.

Figure 4:
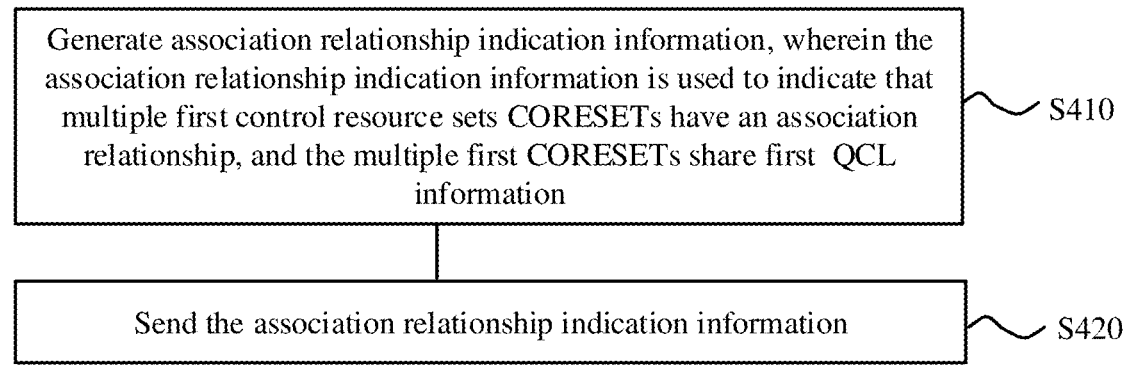
FIG. 4 is a schematic flowchart of a wireless communication method according to another embodiment of the present disclosure.

FIG. 4 shows a wireless communication method according to another embodiment of the present disclosure. The method shown in FIG. 4 may be performed by a network device, and as shown in FIG. 4, the method includes:

S410: Generate association relationship indication information, where the association relationship indication information is used to indicate that multiple first control resource sets CORESETs have an association relationship, and the multiple first CORESETs share first QCL information.

The association relationship indication information in S410 can explicitly indicate that the multiple first CORESETs have the association relationship, and can also implicitly indicate that the multiple first CORESETs have the association relationship.

S420: Send the association relationship indication information.

Optionally, as an embodiment, the association relationship indication information includes antenna set related information.

Optionally, in some embodiments, the related information of the antenna sets corresponding to the multiple first CORESETs is the same.

Optionally, as an embodiment, the antenna set related information includes one of the following information: an antenna set identifier; related information of a reference signal RS resource, where the related information of the RS resource and the antenna set have an association relationship; related information of an RS resource set, where the related information of the RS resource set and the antenna set have an association relationship; a TCI state in configuration information of a CORESET, where the TCI state and the antenna set have an association relationship; and an RS set corresponding to a TCI state in configuration information of a CORESET, where the RS set and the antenna set have an association relationship; and an RS corresponding to a TCI state in configuration information of a CORESET, where the RS and the antenna set have an association relationship.

The RS herein can be a sounding reference signal (SRS), and can also be a channel state information reference signal (CSI-RS), etc. The related information of the RS resource set herein can be an RS resource set identifier (or index).

Optionally, as an embodiment, in S420, the sending association relationship indication information includes:

sending the antenna set related information through at least one of: the configuration information of CORESET; the TCI state in the configuration information of CORESET; configuration information of RS set corresponding to TCI state in the configuration information of CORESET; configuration information of an RS corresponding to a TCI state in configuration information of a CORESET; configuration information of an RS resource corresponding to a TCI state in configuration information of a CORESET; configuration information of an RS resource set, where at least one RS resource in the RS resource set is an RS resource corresponding to a TCI state in configuration information of a CORESET; configuration information of an RS resource, where at least one RS resource in at least one RS resource set configured for the configuration information of the RS resource is an RS resource corresponding to a TCI state in configuration information of a CORESET; or reporting configuration information, where at least one RS resource in at least one RS resource set associated with the reporting configuration information is an RS resource corresponding to a TCI state in configuration information of a CORESET.

It can be understood that if the antenna set related information is sent through the configuration information of the RS corresponding to the TCI state in the configuration information of CORESET, the antenna set (the antenna set determined according to the antenna set related information) associated with CORESET is used to transmit all the control information in CORESET and the RS corresponding to the TCI state in the configuration information of CORESET.

Alternatively, if the antenna set related information is sent through the configuration information of the RS set corresponding to the TCI state in the configuration information of CORESET, the antenna set (the antenna set determined according to the antenna set related information) associated with CORESET is used to transmit all the control information in CORESET and all RSs in the RS set corresponding to the TCI state in the configuration information of CORESET.

Alternatively, if the antenna set related information is sent through the configuration information of the RS resource of the RS corresponding to the TCI state in the configuration information of CORESET, the antenna set associated with CORESET is used to transmit all the control information in CORESET and the RS on the RS resource corresponding to the TCI state in the configuration information of CORESET.

Alternatively, if the antenna set related information is sent through the configuration information of the RS resource set, the antenna set associated with CORESET is used to transmit all the control information in CORESET and RSs on all the RS resources in the RS resource set.

Alternatively, if the antenna set related information is sent through the configuration information of the RS resource, the antenna set associated with CORESET is used to transmit all the control information in CORESET and RSs on all the RS resources in all the RS resource sets configured by the configuration information of the RS resource.

Alternatively, if the antenna set related information is sent through the reporting configuration information, the antenna set associated with CORESET is used to transmit all the control information in CORESET and RSs on all the RS resources in all the RS resource sets associated with the reporting configuration information.

For example, the RS is a CSI-RS, the configuration information of the RS resource (Resource Config parameter) can be information carried in the RRC signaling parameter CSI-ResourceConfig, and the reporting configuration information (ReportConfig parameter) can be information carried in the RRC signaling parameter CSI-ReportConfig.

Optionally, as an example, if the antenna set related information is one of the antenna set identifier, the related information of the RS resource, and the related information of the RS resource set, the antenna set related information is sent through the configuration information of CORESET or the TCI state in the configuration information of CORESET. Alternatively, it is understood as if the antenna set related information is one of the antenna set identifier, the related information of the RS resource, and the related information of the RS resource set, the antenna set related information is carried in the configuration information of CORESET, or carried in the TCI state in the configuration information of CORESET.

Alternatively, if the antenna set related information is the RS corresponding to the TCI state in the configuration information of CORESET, the antenna set related information is received through the TCI state in the configuration information of CORESET, or the antenna set related information is sent through the configuration information of the RS set corresponding to the TCI state in the configuration information of CORESET. Alternatively, it is understood as if the antenna set related information is the RS corresponding to the TCI state in the configuration information of CORESET, the antenna set related information is carried in the TCI state in the configuration information of CORESET, or the antenna set related information is carried in the configuration information of the RS set corresponding to the TCI state in the configuration information of CORESET.

Alternatively, if the antenna set related information is the RS set corresponding to the TCI state in the configuration information of CORESET, the antenna set related information is sent through the TCI state in the configuration information of CORESET. Alternatively, it is understood as if the antenna set related information is the RS set corresponding to the TCI state in the configuration information of CORESET, the antenna set related information is carried in the TCI state in the configuration information of CORESET.

Alternatively, if the antenna set related information is related information of the RS resource set, the antenna set related information is sent through configuration information of the RS resource of the RS corresponding to the TCI state in the configuration information of CORESET, or through the configuration information of the RS resource set of the RS corresponding to the TCI state in the configuration information of CORESET. Alternatively, it is understood as if the antenna set related information is the RS resource set related information, the antenna set related information is carried in the configuration information of the RS resource of the RS corresponding to the TCI state in the configuration information of CORESET, or the antenna set related information is carried in the configuration information of the RS resource set of the RS corresponding to the TCI state in the configuration information of CORESET.

For example, assuming that the antenna set related information is an SRS resource set index, and the RS corresponding to the TCI state in the configuration information of CORESET is a CSI-RS, the SRS resource set index can be carried in NZP-CSI-RS-Resource, or the SRS resource set index can be carried in NZP-CSI-RS-ResourceSet.

Optionally, as an embodiment, the method shown in FIG. 4 further includes: determining a first shared beam set of the multiple first CORESETs according to the first QCL information; and determining the first shared beam set as a default beam set of the multiple first CORESETs.

Optionally, as an embodiment, a beam in the first shared beam set corresponds to at least one antenna set.

Optionally, as an embodiment, the multiple first CORESETs are located in the same component carrier CC, or at least two first CORESETs in the multiple first CORESETs are located in different CCs.

Optionally, as an embodiment, the method shown in FIG. 4 further includes: determining a target reference signal RS or a target channel associated with the multiple first CORESETs; and determining beam information of the target RS or the target channel according to the first QCL information.

Optionally, as an embodiment, the determining beam information of the target RS or the target channel according to the first QCL information includes: in a case where the target RS is a target downlink RS or the target channel is a target downlink channel, determining the first QCL information as QCL information of the target RS or the target channel; and in a case where the target RS is a target uplink RS or the target channel is a target uplink channel, determining spatial relation information of the target RS or the target channel according to a source RS corresponding to a transmission configuration indicator TCI state used to indicate the first QCL information.

Optionally, as an embodiment, the target RS includes at least one of: a source RS corresponding to a TCI state configured for the multiple first CORESETs; an RS whose corresponding source RS is the same as a source RS corresponding to a TCI state configured for the multiple first CORESETs; an RS that is associated with the multiple first CORESETs and indicated by radio resource control RRC signaling; an RS that is associated with the multiple first CORESETs and indicated by the MAC CE; or all RSs transmitted in an antenna set corresponding to the multiple first CORESETs.

It can be understood that if the target RS includes the RS associated with the multiple first CORESETs and indicated by the RRC signaling, the network device may use newly added RRC signaling to indicate the RS associated with the multiple first CORESETs. Alternatively, if the target RS includes the RS associated with the multiple first CORESETs and indicated by the MAC CE, the network device may use newly added MAC CE to indicate the RS associated with the multiple first CORESETs.

Optionally, as an embodiment, the target channel includes at least one of: a PDSCH scheduled by a physical downlink control channel PDCCH transmitted on the multiple first CORESETs; a channel whose corresponding source RS is the same as a source RS corresponding to a TCI state configured for the multiple first CORESETs; a channel that is associated with the multiple first CORESETs and indicated by RRC signaling; a channel that is associated with the multiple first CORESETs and indicated by the MAC CE; channels in all channels transmitted in an antenna set corresponding to the multiple first CORESETs other than channels in the multiple first CORESETs; or a physical uplink shared channel PUSCH scheduled by a PDCCH transmitted in the multiple first CORESETs.

It can be understood that if the target channel includes the channel associated with the multiple first CORESETs and indicated by the RRC signaling, the network device may use newly added RRC signaling to indicate the channel associated with the multiple first CORESETs. Alternatively, if the target channel includes the channel associated with the multiple first CORESETs and indicated by the MAC CE, the network device may use newly added MAC CE to indicate the channel associated with the multiple first CORESETs.

Optionally, as an embodiment, the association relationship indication information is further used to indicate that multiple second control resource set CORESETs have an association relationship, the multiple first CORESETs and the multiple second CORESETs have no association relationship, and the multiple second CORESETs share second QCL information.

Optionally, in some embodiments, the related information of the antenna sets corresponding to the multiple second CORESETs is the same.

Optionally, as an embodiment, the method shown in FIG. 4 further includes: determining a second shared beam set of the multiple second CORESETs according to the second QCL information; and determining the second shared beam set as a default beam set of the multiple second CORESETs.

Optionally, as an embodiment, the first shared beam set and the second shared beam set are different.

Optionally, as an embodiment, the first shared beam set and the second shared beam set are used to implement simultaneous transmission of control information in the multiple first CORESETs and control information in the multiple second CORESETs. For example, the network device may use the first shared beam set and the second shared beam set to implement simultaneous sending of control information in the multiple first CORESETs and control information in the multiple second CORESETs.

Optionally, in some embodiments, multiple first CORESETs share the same candidate TCI state. That is, the network device may configure the same candidate TCI state for multiple first CORESETs. For example, the network device may configure the same candidate TCI state for multiple first CORESETs through RRC signaling.

Optionally, as an embodiment, the number of candidate TCI states is multiple, and the method shown in FIG. 4 further includes: sending a MAC CE command, where the MAC CE command is used to indicate a first target TCI state in the candidate TCI states.

Optionally, as an embodiment, the method shown in FIG. 4 further includes: determining a target first CORESET in the multiple first CORESETs; and configuring QCL information for the target first CORESET, so that the terminal device determines the QCL information of the target first CORESET as the first QCL information.

The network device can only configure QCL information for the target first CORESET through RRC signaling (or RRC signaling and MAC CE signaling), and other CORESETs in the multiple first CORESETs share the QCL information of the target first CORESET. The network device does not need to configure QCL information for each first CORESET separately, to reduce signaling overheads.

The target first CORESET herein may be a CORESET that meets certain rules (requirements) in the multiple first CORESETs. For example, the target first CORESET is the CORESET whose index is a preset value in the multiple first CORESETs, or the target first CORESET is the CORESET with the lowest (or the highest) index in the multiple first CORESETs.

Optionally, as an embodiment, the method shown in FIG. 4 further includes: determining a first shared resource used by feedback information of a physical downlink shared channel PDSCH scheduled by the control information in the multiple first CORESETs; and determining a second shared resource used by feedback information of a PDSCH scheduled by control information in the multiple second CORESETs, where the first shared resource is different from the second shared resource.

Optionally, as an embodiment, the first shared resource is a physical uplink control channel PUCCH resource; and/or the second shared resource is a PUCCH resource.

The wireless communication method according to some embodiments of the present disclosure is described in detail above with reference to FIG. 1 to FIG. 4, and the terminal device according to some embodiments of the present disclosure will be described in detail below with reference to FIG. 5.

Figure 5:
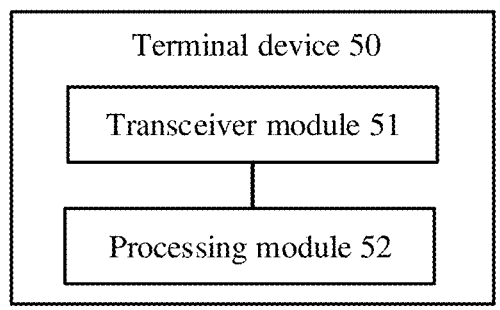
FIG. 5 is a schematic structural diagram of a terminal device according to an embodiment of the present disclosure.

FIG. 5 is a schematic structural diagram of a terminal device according to an embodiment of the present disclosure. As shown in FIG. 5, a terminal device 50 includes:
a transceiver module 51, configured to receive association relationship indication information; and
a processing module 52, configured to determine that multiple first CORESETs have an association relationship, where the multiple first CORESETs share first QCL information.

According to the device in some embodiments of the present disclosure, it can be determined that multiple CORESETs have an association relationship according to the association relationship indication information, and the multiple CORESETs share the quasi co-location QCL information, so that the network device does not need to configure QCL information for each CORESET, to reduce signaling overheads.

Optionally, as an embodiment, the processing module 52 is further configured to:
determine a first shared beam set of the multiple first CORESETs according to the first QCL information; and
determine the first shared beam set as a default beam set of the multiple first CORESETs.

Optionally, as an embodiment, a beam in the first shared beam set corresponds to at least one antenna set.

Optionally, as an embodiment, the multiple first CORESETs are located in the same component carrier CC, or
at least two first CORESETs of the multiple first CORESETs are in different CCs.

Optionally, as an embodiment, the processing module 52 is further configured to:
determining a target reference signal RS or a target channel associated with the multiple first CORESETs; and
determine beam information of the target RS or the target channel according to the first QCL information.

Optionally, as an embodiment, the processing module 52 is specifically configured to:
in a case where the target RS is a target downlink RS or the target channel is a target downlink channel, determine the first QCL information as QCL information of the target RS or the target channel; and
in a case where the target RS is a target uplink RS or the target channel is a target uplink channel, determine spatial relation information of the target RS or the target channel according to a source RS corresponding to a transmission configuration indicator TCI state used to indicate the first QCL information.

Optionally, as an embodiment, the target RS includes at least one of:
a source RS corresponding to a TCI state configured for the multiple first CORESETs;
an RS whose corresponding source RS is the same as a source RS corresponding to a TCI state configured for the multiple first CORESETs;
an RS that is associated with the multiple first CORESETs and indicated by radio resource control RRC signaling;
an RS that is associated with the multiple first CORESETs and indicated by the MAC CE; or all RSs transmitted in an antenna set corresponding to the multiple first CORESETs.

Optionally, as an embodiment, the target channel includes at least one of:
a PDSCH scheduled by a physical downlink control channel PDCCH transmitted on the multiple first CORESETs;
a channel whose corresponding source RS is the same as a source RS corresponding to a TCI state configured for the multiple first CORESETs;
a channel that is associated with the multiple first CORESETs and indicated by RRC signaling;
a channel that is associated with the multiple first CORESETs and indicated by the MAC CE;
channels in all channels transmitted in an antenna set corresponding to the multiple first CORESETs other than channels in the multiple first CORESETs; or
a physical uplink shared channel PUSCH scheduled by a PDCCH transmitted in the multiple first CORESETs.

Optionally, as an embodiment, the processing module 52 is further configured to:
determine that multiple second CORESETs have an association relationship according to the association relationship indication information, where the multiple first CORESETs and the multiple second CORESETs have no association relationship, and the multiple second CORESETs share second QCL information.

Optionally, as an embodiment, the processing module 52 is further configured to:
determine a second shared beam set of the multiple second CORESETs according to the second QCL information; and
determine the second shared beam set as a default beam set of the multiple second CORESETs.

Optionally, as an embodiment, the first shared beam set and the second shared beam set are different.

Optionally, as an embodiment, the first shared beam set and the second shared beam set are used to implement simultaneous transmission of control information in the multiple first CORESETs and control information in the multiple second CORESETs.

Optionally, as an embodiment, the association relationship indication information includes antenna set related information.

The processing module 52 is specifically configured to:
determine that the multiple first CORESETs have an association relationship according to the antenna set related information.

Optionally, as an embodiment, the processing module 52 is specifically configured to:
in a case where antenna set related information corresponding to the multiple first CORESETs is the same, determine that the multiple first CORESETs have an association relationship.

Optionally, as an embodiment, the processing module 52 is specifically configured to:
in a case where antenna set related information corresponding to the multiple second CORESETs is the same, determine that the multiple second CORESETs have an association relationship.

Optionally, as an embodiment, the antenna set related information includes one of the following information:
an antenna set identifier;
related information of a reference signal RS resource, where the related information of the RS resource and the antenna set have an association relationship;
related information of an RS resource set, where the related information of the RS resource set and the antenna set have an association relationship;
a TCI state in configuration information of a CORESET, where the TCI state and the antenna set have an association relationship;
an RS set corresponding to a TCI state in configuration information of a CORESET, where the RS set and the antenna set have an association relationship; and
an RS corresponding to a TCI state in configuration information of a CORESET, where the RS and the antenna set have an association relationship.

Optionally, as an embodiment, the transceiver module 51 is specifically configured to:
receive the antenna set related information through at least one of:
configuration information of a CORESET;
a TCI state in configuration information of a CORESET;
configuration information of an RS set corresponding to a TCI state in configuration information of a CORESET;
configuration information of an RS corresponding to a TCI state in configuration information of a CORESET;
configuration information of an RS resource corresponding to a TCI state in configuration information of a CORESET;
configuration information of an RS resource set, where at least one RS resource in the RS resource set is an RS resource corresponding to a TCI state in configuration information of a CORESET;
configuration information of an RS resource, where at least one RS resource in at least one RS resource set configured for the configuration information of the RS resource is an RS resource corresponding to a TCI state in configuration information of a CORESET; or
reporting configuration information, where at least one RS resource in at least one RS resource set associated with the reporting configuration information is an RS resource corresponding to a TCI state in configuration information of a CORESET.

Optionally, as an embodiment, multiple first CORESETs share the same candidate TCI state.

Optionally, as an embodiment, the processing module 52 is specifically configured to:
in a case where the number of candidate TCI states is one, determine QCL information indicated by the candidate TCI state as the first QCL information; and
in a case where the number of candidate TCI states is multiple, receive a MAC CE command, and determine QCL information indicated by a first target TCI state indicated by the MAC CE in the candidate TCI states as the first QCL information.

Optionally, as an embodiment, the processing module 52 is further configured to:
determine a target first CORESET in the multiple first CORESETs; and
determine QCL information of the target first CORESET as the first QCL information.

Optionally, as an embodiment, the processing module 52 is further configured to:
determine a first shared resource used by feedback information of a physical downlink shared channel PDSCH scheduled by the control information in the multiple first CORESETs; and
determine a second shared resource used by feedback information of a PDSCH scheduled by control information in the multiple second CORESETs, where the first shared resource is different from the second shared resource.

Optionally, as an embodiment, the first shared resource is a physical uplink control channel PUCCH resource; and/or the second shared resource is a PUCCH resource.

The device provided in some embodiments of the present disclosure can implement processes implemented by the terminal device in the method embodiments of FIG. 1 to FIG. 3. To avoid repetition, details are not described herein again.

Figure 6:
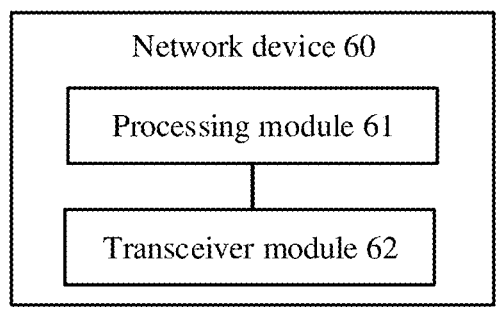
FIG. 6 is a schematic structural diagram of a network device according to an embodiment of the present disclosure.

FIG. 6 is a schematic structural diagram of a network device according to an embodiment of the present disclosure. As shown in FIG. 6, the network device 60 includes:
a processing module 61, configured to generate association relationship indication information, where the association relationship indication information is used to indicate that the multiple first control resource sets CORESET have an association relationship, and the multiple first CORESETs share first QCL information; and
a transceiver module 62, configured to send the association relationship indication information.

Optionally, as an embodiment, the processing module 61 is further configured to:
determine a first shared beam set of the multiple first CORESETs according to the first QCL information; and
determine the first shared beam set as a default beam set of the multiple first CORESETs.

Optionally, as an embodiment, a beam in the first shared beam set corresponds to at least one antenna set.

Optionally, as an embodiment, the multiple first CORESETs are located in the same component carrier CC, or at least two first CORESETs of the multiple first CORESETs are in different CCs.

Optionally, as an embodiment, the processing module 61 is further configured to:
determine a target reference signal RS or a target channel associated with the multiple first CORESETs; and
determine beam information of the target RS or the target channel according to the first QCL information.

Optionally, as an embodiment, the processing module 61 is further configured to:
in a case where the target RS is a target downlink RS or the target channel is a target downlink channel, determine the first QCL information as QCL information of the target RS or the target channel; and
in a case where the target RS is a target uplink RS or the target channel is a target uplink channel, determine spatial relation information of the target RS or the target channel according to a source RS corresponding to a transmission configuration indicator TCI state used to indicate the first QCL information.

Optionally, as an embodiment, the target RS includes at least one of:
a source RS corresponding to a TCI state configured for the multiple first CORESETs;
an RS whose corresponding source RS is the same as a source RS corresponding to a TCI state configured for the multiple first CORESETs;
an RS that is associated with the multiple first CORESETs and indicated by radio resource control RRC signaling;
an RS that is associated with the multiple first CORESETs and indicated by the MAC CE; or all RSs transmitted in an antenna set corresponding to the multiple first CORESETs.

Optionally, as an embodiment, the target channel includes at least one of:
a PDSCH scheduled by a physical downlink control channel PDCCH transmitted on the multiple first CORESETs;
a channel whose corresponding source RS is the same as a source RS corresponding to a TCI state configured for the multiple first CORESETs;
a channel that is associated with the multiple first CORESETs and indicated by RRC signaling;
a channel that is associated with the multiple first CORESETs and indicated by the MAC CE;
channels in all channels transmitted in an antenna set corresponding to the multiple first CORESETs other than channels in the multiple first CORESETs; or
a physical uplink shared channel PUSCH scheduled by a PDCCH transmitted in the multiple first CORESETs.

Optionally, as an embodiment, the association relationship is further used to indicate that multiple second control resource set CORESETs have an association relationship, the multiple first CORESETs and the multiple second CORESETs have no association relationship, and the multiple second CORESETs share second QCL information.

Optionally, as an embodiment, the processing module 61 is further configured to:
determine a second shared beam set of the multiple second CORESETs according to the second QCL information; and
determine the second shared beam set as a default beam set of the multiple second CORESETs.

Optionally, as an embodiment, the first shared beam set and the second shared beam set are different.

Optionally, as an embodiment, the first shared beam set and the second shared beam set are used to implement simultaneous transmission of control information in the multiple first CORESETs and control information in the multiple second CORESETs.

Optionally, as an embodiment, the association relationship indication information includes antenna set related information.

Optionally, as an embodiment, the related information of the antenna sets corresponding to the multiple first CORESETs is the same.

Optionally, as an embodiment, the related information of the antenna sets corresponding to the multiple second CORESETs is the same.

Optionally, as an embodiment, the antenna set related information includes one of the following information:
an antenna set identifier;
related information of a reference signal RS resource, where the related information of the RS resource and the antenna set have an association relationship;
related information of an RS resource set, where the related information of the RS resource set and the antenna set have an association relationship;
a TCI state in configuration information of a CORESET, where the TCI state and the antenna set have an association relationship;
an RS set corresponding to a TCI state in configuration information of a CORESET, where the RS set and the antenna set have an association relationship; and
an RS corresponding to a TCI state in configuration information of a CORESET, where the RS and the antenna set have an association relationship.

Optionally, as an embodiment, the transceiver module 62 is specifically configured to:
send the antenna set related information through at least one of:
configuration information of a CORESET;
a TCI state in configuration information of a CORESET;
configuration information of an RS set corresponding to a TCI state in configuration information of a CORESET;
configuration information of an RS corresponding to a TCI state in configuration information of a CORESET;
configuration information of an RS resource corresponding to a TCI state in configuration information of a CORESET;
configuration information of an RS resource set, where at least one RS resource in the RS resource set is an RS resource corresponding to a TCI state in configuration information of a CORESET;
configuration information of an RS resource, where at least one RS resource in at least one RS resource set configured for the configuration information of the RS resource is an RS resource corresponding to a TCI state in configuration information of a CORESET; or
reporting configuration information, where at least one RS resource in at least one RS resource set associated with the reporting configuration information is an RS resource corresponding to a TCI state in configuration information of a CORESET.

Optionally, as an embodiment, multiple first CORESETs share the same candidate TCI state.

Optionally, as an embodiment, the number of candidate TCI states is multiple, and the transceiver module 62 is further configured to:
send a MAC CE command, where the MAC CE command is used to indicate a first target TCI state in the candidate TCI states.

Optionally, as an embodiment, the processing module 61 is further configured to:
determine a target first CORESET in the multiple first CORESETs; and
configure QCL information for the target first CORESET, so that the terminal device determines the QCL information of the target first CORESET as the first QCL information.

Optionally, as an embodiment, the processing module 61 is further configured to:
determine a first shared resource used by feedback information of a physical downlink shared channel PDSCH scheduled by the control information in the multiple first CORESETs; and
determine a second shared resource used by feedback information of a PDSCH scheduled by control information in the multiple second CORESETs, where the first shared resource is different from the second shared resource.

Optionally, as an embodiment, the first shared resource is a physical uplink control channel PUCCH resource; and/or the second shared resource is a PUCCH resource.

The device provided in some embodiments of the present disclosure can implement processes implemented by the terminal device in the method embodiments of FIG. 4. To avoid repetition, details are not described herein again.

Figure 7:
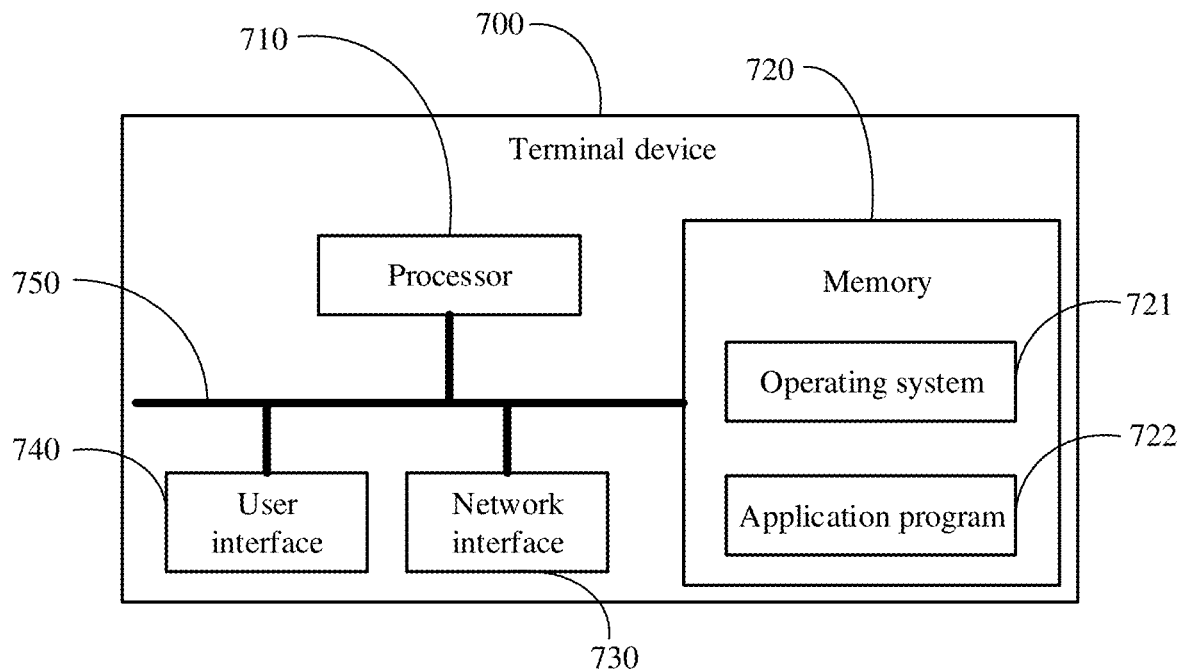
FIG. 7 is a schematic structural diagram of a terminal device according to another embodiment of the present disclosure.

FIG. 7 is a block diagram of a terminal device according to another embodiment of the present disclosure. As shown in FIG. 7, the terminal device 700 includes at least one processor 701, a memory 702, a user interface 703, and at least one network interface 704. Components in the terminal device 700 are coupled together by using a bus system 705. It can be understood that the bus system 705 is configured to implement connection and communication between these components. In addition to a data bus, the bus system 705 further includes a power bus, a control bus, and a status signal bus. However, for clear description, various buses are marked as the bus system 705 in FIG. 7.

The user interface 703 may include a display, a keyboard, or a clicking device (for example, a mouse, a trackball), a touch panel, or a touchscreen.

It may be understood that the memory 702 in some embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. As exemplary but not imitative descriptions, many forms of RAMs may be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 702 in the system and the method described in some embodiments of the present disclosure is intended to include, but is not limited to, these memories and memories of any other proper type.

In some implementations, the memory 702 stores the following element: an executable module or a data structure, a subset thereof, or an extended set thereof: an operating system 7021 and an application program 7022.

The operating system 7021 includes various system programs, for example, a framework layer, a kernel library layer, and a driver layer, and is configured to implement various basic services and process hardware-based tasks. The application program 7022 includes various application programs, for example, a media player and a browser, and is configured to implement various application services. A program for implementing the method in some embodiments of the present disclosure may be included in the application program 7022.

In some embodiments of the present disclosure, the terminal device 700 further includes: a computer program stored in the memory 702 and executable on the processor 701, where when the computer program is executed by the processor 701, the processes of the foregoing methods in FIG. 1 to FIG. 3 are implemented, and the same technical effects can be achieved. To avoid repetition, details are not described herein again.

The methods disclosed in some embodiments of the present disclosure may be applied to the processor 701 or implemented by the processor 701. The processor 701 may be an integrated circuit chip having a signal processing capability. During implementation, the steps of the foregoing method can be completed by hardware integrated logic circuits in the processor 701 or instructions in the form of software. The processor 701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 701 may implement or execute the methods, steps, and logic block diagrams disclosed in some embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 702, and the processor 701 reads information from the memory 702 and completes the steps of the foregoing method in combination with its hardware. For example, the non-transitory computer readable storage medium stores a computer program, and when the computer program is executed by the processor 701, the steps of the method embodiments shown in FIG. 1 to FIG. 3 are performed.

It can be understood that those embodiments described in some embodiments of the present disclosure can be implemented with hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, the technology described in some embodiments of the present disclosure may be implemented by executing functional modules (for example, a process and a function) described in some embodiments of the present disclosure. Software codes can be stored in the memory and executed by the processor. The memory can be implemented inside or outside the processor.

Figure 8:
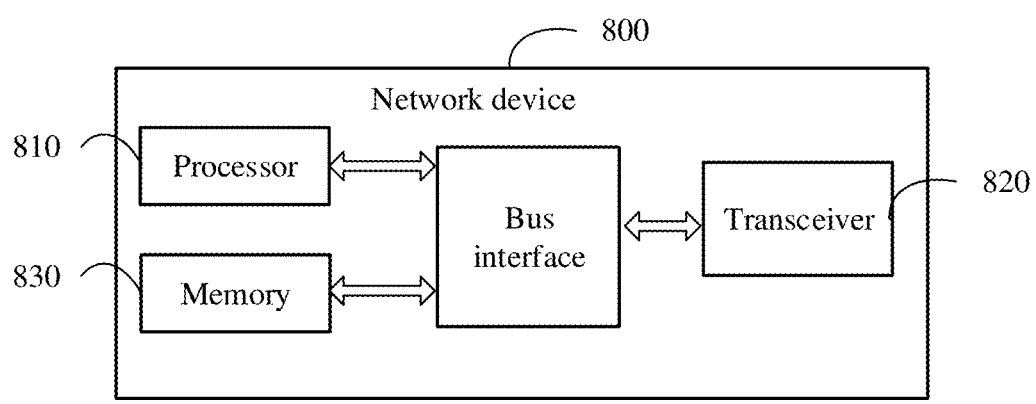
FIG. 8 is a schematic structural diagram of a network device according to another embodiment of the present disclosure.

FIG. 8 is a schematic structural diagram of a network device according to another embodiment of the present disclosure. As shown in FIG. 8, a network device 800 includes: a processor 801, a transceiver 802, a memory 803, and a bus interface.

In some embodiments of the present disclosure, the network device 800 further includes: a computer program stored in the memory 803 and executable on the processor 801. When the computer program is executed by the processor 801, the processes of the foregoing method in FIG. 4 are implemented, and the same technical effects can be achieved. To avoid repetition, details are not described herein again.

In FIG. 8, a bus architecture may include any quantity of interconnected buses and bridges, which may be connected together by various circuits of one or more processors represented by the processor 801 and a memory represented by the memory 803. The bus architecture may further link various other circuits such as a peripheral device, a voltage regulator, and a power management circuit together. These are all well-known in the art, and therefore are not further described in this specification. The bus interface provides an interface. The transceiver 802 may include a plurality of elements, that is, include a transmitter and a receiver, and provide units for communication with various other apparatuses on a transmission medium.

The processor 801 is responsible for managing the bus architecture and common processing, and the memory 803 may store data used when the processor 801 performs an operation.

The embodiments of the present disclosure further provide a non-transitory computer-readable storage medium. The computer-readable storage medium stores a computer program, and when the computer program is executed by a processor, the processes in the method embodiment shown in FIG. 1 to FIG. 4 are implemented, and a same technical effect can be achieved. To avoid repetition, details are not described herein. The non-transitory computer-readable storage medium is, for example, a read-only memory (Read-Only Memory, ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A wireless communication method, comprising:
   receiving, by a terminal device, association relationship indication information; and
   determining, by the terminal device, according to the association relationship indication information, that multiple first control resource sets (CORESETs) have an association relationship, wherein the multiple first CORESETs share first quasi co-location (QCL) information;
   wherein the method further comprises:
   determining, by the terminal device, according to the association relationship indication information, that multiple second CORESETs have an association relationship, wherein the multiple first CORESETs and the multiple second CORESETs have no association relationship, and the multiple second CORESETs share second QCL information.

2. The method according to claim 1, wherein the multiple first CORESETs are in a same component carrier (CC); or at least two first CORESETs of the multiple first CORESETs are in different CCs.

3. The method according to claim 1, further comprising:
   determining, by the terminal device, a target reference signal (RS) or a target channel associated with the multiple first CORESETs; and
   determining, by the terminal device, according to the first QCL information, beam information of the target RS or the target channel.

4. The method according to claim 3, wherein the determining, by the terminal device, according to the first QCL information, beam information of the target RS or the target channel according to the first QCL information comprises:
   in a case where the target RS is a target downlink RS or the target channel is a target downlink channel, determining, by the terminal device, the first QCL information as QCL information of the target RS or the target channel; and
   in a case where the target RS is a target uplink RS or the target channel is a target uplink channel, determining, by the terminal device, spatial relation information of the target RS or the target channel according to a source RS corresponding to a transmission configuration indicator (TCI) state used to indicate the first QCL information.

5. The method according to claim 3, wherein the target RS comprises at least one of:
   a source RS corresponding to a transmission configuration indicator (TCI) state configured for the multiple first CORESETs;
   an RS whose corresponding source RS is the same as a source RS corresponding to a TCI state configured for the multiple first CORESETs;
   an RS that is associated with the multiple first CORESETs and indicated by radio resource control (RRC) signaling;
   an RS that is associated with the multiple first CORESETs and indicated by a media access control (MAC) control element (CE); or
   all RSs transmitted in an antenna set corresponding to the multiple first CORESETs.

6. The method according to claim 3, wherein the target channel comprises at least one of:

a physical downlink shared channel (PDSCH) scheduled by a physical downlink control channel (PDCCH) transmitted on the multiple first CORESETs;

a channel whose corresponding source RS is the same as a source RS corresponding to a transmission configuration (TCI) state configured for the multiple first CORESETs;

a channel that is associated with the multiple first CORESETs and indicated by RRC signaling;

a channel that is associated with the multiple first CORESETs and indicated by a media access control (MAC) control element (CE);

channels in all channels transmitted in an antenna set corresponding to the multiple first CORESETs other than channels in the multiple first CORESETs; or a physical uplink shared channel (PUSCH) scheduled by a PDCCH transmitted in the multiple first CORESETs.

7. The method according to claim 1, wherein the association relationship indication information comprises antenna set related information; and the determining, by the terminal device, according to the association relationship indication information, that multiple first CORESETs have an association relationship comprises:

determining, by the terminal device, according to the association relationship indication information, that the multiple first CORESETs have an association relationship.

8. The method according to claim 7, wherein the determining, by the terminal device, according to the association relationship indication information, that the multiple first CORESETs have an association relationship comprises:

in a case where antenna set related information corresponding to the multiple first CORESETs is the same, determining, by the terminal device, that the multiple first CORESETs have an association relationship.

9. The method according to claim 7, wherein the antenna set related information comprises one of following information:

an antenna set identifier;

related information of a reference signal (RS) resource, wherein the related information of the RS resource and the antenna set have an association relationship;

related information of an RS resource set, wherein the related information of the RS resource set and the antenna set have an association relationship;

a transmission configuration indicator (TCI) state in configuration information of a CORESET, wherein the TCI state and the antenna set have an association relationship;

an RS set corresponding to a TCI state in configuration information of a CORESET, wherein the RS set and the antenna set have an association relationship; and an RS corresponding to a TCI state in configuration information of a CORESET, wherein the RS and the antenna set have an association relationship.

10. The method according to claim 7, wherein the receiving, by the terminal device, the association relationship indication information comprises:

receiving, by the terminal device, the antenna set related information through at least one of:

configuration information of a CORESET;

a transmission configuration indicator (TCI) state in configuration information of a CORESET;

configuration information of a reference signal (RS) set corresponding to a TCI state in configuration information of a CORESET;

configuration information of an RS corresponding to a TCI state in configuration information of a CORESET;

configuration information of an RS resource corresponding to a TCI state in configuration information of a CORESET;

configuration information of an RS resource set, wherein at least one RS resource in the RS resource set is an RS resource corresponding to a TCI state in configuration information of a CORESET;

configuration information of an RS resource, wherein at least one RS resource in at least one RS resource set in the configuration information of the RS resource is an RS resource corresponding to a TCI state in configuration information of a CORESET; or reporting configuration information, wherein at least one RS resource in at least one RS resource set associated with the reporting configuration information is an RS resource corresponding to a TCI state in configuration information of a CORESET.

11. The method according to claim 1, further comprising:

determining, by the terminal device, a target first CORESET in the multiple first CORESETs; and determining, by the terminal device, QCL information of the target first CORESET as the first QCL information.

12. The method according to claim 1, further comprising:

determining, by the terminal device, a first shared resource used by feedback information of a physical downlink shared channel (PDSCH) scheduled by the control information in the multiple first CORESETs; and determining, by the terminal device, a second shared resource used by feedback information of a PDSCH scheduled by control information in the multiple second CORESETs, wherein the first shared resource is different from the second shared resource.

13. A terminal device, comprising a memory, a processor, and a computer program stored in the memory and executable on the processor, wherein the computer program, when executed by the processor, causes the terminal device to perform:

receiving association relationship indication information;

determining according to the association relationship indication information, that multiple first control resource sets (CORESETs) have an association relationship, wherein the multiple first CORESETs share first quasi co-location (QCL) information; and determining that multiple second CORESETs have an association relationship according to the association relationship indication information, wherein the multiple first CORESETs and the multiple second CORESETs have no association relationship, and the multiple second CORESETs share second QCL information.

14. The terminal device according to claim 13, wherein the multiple first CORESETs are in a same component carrier (CC); or at least two first CORESETs of the multiple first CORESETs are in different CCs.

15. The terminal device according to claim 13, wherein the computer program, when executed by the processor, causes the terminal device to further perform:

determining a target reference signal (RS) or a target channel associated with the multiple first CORESETs; and determining beam information of the target RS or the target channel according to the first QCL information.

16. The terminal device according to claim 13, wherein the association relationship indication information comprises antenna set related information; and the computer program, when executed by the processor, causes the terminal device to perform:

determining, according to the association relationship indication information, that the multiple first CORESETs have an association relationship.

17. The terminal device according to claim 16, wherein the computer program, when executed by the processor, causes the terminal device to perform:

in a case where antenna set related information corresponding to the multiple first CORESETs is the same, determining that the multiple first CORESETs have an association relationship.

18. A network device, comprising a memory, a processor, and a computer program stored in the memory and executable on the processor, wherein the computer program, when executed by the processor, causes the network device to perform:

generating association relationship indication information, wherein the association relationship indication information is used to indicate that multiple first control resource sets (CORESETs) have an association relationship, and the multiple first CORESETs share first quasi co-location (QCL) information; and sending the association relationship indication information;

wherein the association relationship indication information is further used to indicate that multiple second CORESETs have an association relationship, wherein the multiple first CORESETs and the multiple second CORESETs have no association relationship, and the multiple second CORESETs share second QCL information.

19. The network device according to claim 18, wherein the computer program, when executed by the processor, causes the network device to further perform:

determining a first shared beam set of the multiple first CORESETs according to the first QCL information; and determining the first shared beam set as a default beam set of the multiple first CORESETs.

20. The network device according to claim 19, wherein a beam in the first shared beam set corresponds to at least one antenna set.

* * * * *